US012419217B2

(12) United States Patent
Grieshop et al.

(10) Patent No.: US 12,419,217 B2
(45) Date of Patent: Sep. 23, 2025

(54) AUTOMATED GRAIN FILLING SYSTEM AND RELATED METHODS

(71) Applicant: J. & M. Manufacturing Co., Inc., Ft. Recovery, OH (US)

(72) Inventors: Dustan Grieshop, Ft. Recovery, OH (US); Sean Kahlig, Ft. Recovery, OH (US)

(73) Assignee: J. & M. Manufacturing Co., Inc., Ft. Recovery, OH (US)

( * ) Notice: Subject to any disclaimer, the term of this patent is extended or adjusted under 35 U.S.C. 154(b) by 0 days.

(21) Appl. No.: 18/107,147

(22) Filed: Feb. 8, 2023

(65) Prior Publication Data
US 2023/0180659 A1    Jun. 15, 2023

Related U.S. Application Data

(63) Continuation of application No. PCT/US2021/045768, filed on Aug. 12, 2021.
(Continued)

(51) Int. Cl.
*A01D 41/12* (2006.01)
*A01D 41/04* (2006.01)
(Continued)

(52) U.S. Cl.
CPC ..... *A01D 41/1217* (2013.01); *A01D 41/1261* (2013.01); *A01D 41/1274* (2013.01);
(Continued)

(58) Field of Classification Search
CPC .. A01D 75/18; A01D 51/007; A01D 41/1278; A01D 41/1275; A01D 41/1274;
(Continued)

(56) References Cited

U.S. PATENT DOCUMENTS 4,342,383 A    8/1982  Burnett
4,415,303 A    11/1983 Westendorf
(Continued)

FOREIGN PATENT DOCUMENTS

GB      2216763 A      10/1989
WO   2008024910 A2    2/2008
WO   2014062785 A1    4/2014

OTHER PUBLICATIONS

U.S. Patent and Trademark Office, International Search Report and Written Opinion in corresponding PCT Application No. PCT/US2023/012206, May 16, 2023, 10 pages.
(Continued)

*Primary Examiner* — Timothy L Maust
(74) *Attorney, Agent, or Firm* — Rooney IP, LLC

(57) ABSTRACT

An automated grain filling system including a sensor and a processor. The sensor is configured to detect at least a portion of an upper perimeter of a receiving container and at least a portion of an upper surface of a grain mound in the receiving container. The processor is configured to compare the detected portion of the upper perimeter and the detected portion of the upper surface, and direct the operation of a grain transfer element. The grain transfer element is configured to transfer grain from a supplying container to the receiving container. The directed operation of the grain transfer element is based at least in part on a result of the comparison of the detected portion of the upper perimeter and the detected portion of the upper surface.

44 Claims, 5 Drawing Sheets

Related U.S. Application Data

(60) Provisional application No. 63/065,352, filed on Aug. 13, 2020, provisional application No. 63/091,024, filed on Oct. 13, 2020.

(51) Int. Cl.
*A01D 41/127* (2006.01)
*A01D 51/00* (2006.01)
*A01D 75/18* (2006.01)

(52) U.S. Cl.
CPC ..... *A01D 41/1275* (2013.01); *A01D 41/1278* (2013.01); *A01D 75/18* (2013.01); *A01D 41/04* (2013.01); *A01D 51/007* (2013.01)

(58) Field of Classification Search
CPC . A01D 41/1261; A01D 41/1217; A01D 41/04
See application file for complete search history.

(56) References Cited

U.S. PATENT DOCUMENTS

| | | | |
|---|---|---|---|
| 5,340,265 A | 8/1994 | Grieshop | |
| 5,575,316 A | 11/1996 | Poliklas | |
| 5,675,056 A | 10/1997 | Vance | |
| 5,957,331 A | 9/1999 | Minor et al. | |
| 6,216,071 B1 | 4/2001 | Motz | |
| 6,296,435 B1 | 10/2001 | Wood | |
| 6,776,569 B1 | 8/2004 | McMahon et al. | |
| 7,862,286 B2 | 1/2011 | Mackin | |
| 7,874,899 B2 | 1/2011 | Mackin | |
| 7,877,181 B2 | 1/2011 | Chervenka et al. | |
| 7,938,613 B2 | 5/2011 | Yoder | |
| 8,032,255 B2 | 10/2011 | Phelan et al. | |
| 8,126,620 B2 | 2/2012 | Ringwald et al. | |
| 8,366,372 B2 | 2/2013 | Yoder | |
| 8,414,246 B2 | 4/2013 | Tobey | |
| 8,499,537 B2 | 8/2013 | Correns et al. | |
| 8,656,693 B2 * | 2/2014 | Madsen | A01D 43/087 701/50 |
| 8,695,396 B2 | 4/2014 | Landphair et al. | |
| 8,702,368 B2 | 4/2014 | Van Mill | |
| 8,967,691 B2 | 3/2015 | Mueller et al. | |
| 8,981,949 B2 | 3/2015 | Ricketts et al. | |
| 9,010,819 B2 | 4/2015 | Mueller et al. | |
| 9,085,381 B2 | 7/2015 | Gengerke | |
| 9,113,598 B2 | 8/2015 | Wood | |
| 9,119,342 B2 | 9/2015 | Bonefas | |
| 9,185,845 B2 | 11/2015 | Van Mill et al. | |
| 9,187,259 B2 | 11/2015 | Van Mill et al. | |
| 9,272,853 B2 | 3/2016 | Van Mill et al. | |
| 9,326,444 B2 * | 5/2016 | Bonefas | A01D 43/073 |
| 9,596,805 B2 | 3/2017 | Van Mill et al. | |
| 9,596,809 B2 | 3/2017 | Van Mill et al. | |
| 9,604,785 B1 | 3/2017 | Gaerke | |
| 9,706,713 B2 | 7/2017 | Van Mill | |
| 9,723,789 B2 | 8/2017 | Van Mill | |
| 9,763,389 B2 | 9/2017 | Bump et al. | |
| 9,873,570 B2 | 1/2018 | Van Mill et al. | |
| 9,949,435 B2 | 4/2018 | Banks, Jr. et al. | |
| 10,015,928 B2 * | 7/2018 | Nykamp | A01D 43/073 |
| 10,028,434 B2 | 7/2018 | Van Mill et al. | |
| 10,028,441 B2 | 7/2018 | Van Mill et al. | |
| 10,064,335 B2 * | 9/2018 | Byttebier | A01D 90/12 |
| 10,152,891 B2 * | 12/2018 | Rusciolelli | G05D 1/0088 |
| 10,160,367 B2 | 12/2018 | Van Mill | |
| 10,426,092 B2 | 10/2019 | Van Mill | |
| 10,485,177 B2 | 11/2019 | Bump et al. | |
| 10,542,676 B2 | 1/2020 | Van Mill | |
| 10,647,240 B1 | 5/2020 | Grieshop et al. | |
| 10,743,474 B1 | 8/2020 | Schlimgen | |
| 10,765,063 B2 | 9/2020 | Van Mill et al. | |
| 10,807,812 B2 | 10/2020 | Thomson et al. | |
| 11,008,177 B2 | 5/2021 | Banthia | |
| 11,104,258 B2 | 8/2021 | Grieshop et al. | |
| 11,140,829 B2 | 10/2021 | Van Mill | |
| 11,343,971 B2 | 5/2022 | Van Mill | |
| 11,457,562 B2 | 10/2022 | Van Mill et al. | |
| 11,612,102 B2 * | 3/2023 | Münch | A01D 41/1274 701/50 |
| 11,825,765 B2 | 11/2023 | Van Mill et al. | |
| 2005/0035769 A1 | 2/2005 | Otto et al. | |
| 2006/0240884 A1 | 10/2006 | Klimmer | |
| 2009/0044505 A1 | 2/2009 | Huster et al. | |
| 2010/0254792 A1 | 10/2010 | Kinzenbaw | |
| 2010/0314221 A1 | 12/2010 | Garberson et al. | |
| 2010/0332051 A1 | 12/2010 | Kormann | |
| 2011/0164952 A1 | 7/2011 | Hollenberg | |
| 2012/0085458 A1 | 4/2012 | Wenzel | |
| 2013/0045067 A1 | 2/2013 | Pickett et al. | |
| 2014/0020287 A1 | 1/2014 | Deppermann et al. | |
| 2015/0023767 A1 | 1/2015 | Affleck | |
| 2015/0032252 A1 | 1/2015 | Galluzzo et al. | |
| 2015/0377689 A1 | 12/2015 | Johnson et al. | |
| 2017/0055446 A1 | 3/2017 | Nykamp et al. | |
| 2017/0150679 A1 | 6/2017 | Van Mill et al. | |
| 2017/0368691 A1 | 12/2017 | Li | |
| 2018/0160624 A1 | 6/2018 | Ducroquet | |
| 2018/0317386 A1 | 11/2018 | Van Mill et al. | |
| 2019/0056258 A1 | 2/2019 | Gelada Camps et al. | |
| 2019/0141899 A1 | 5/2019 | Winsnes et al. | |
| 2019/0200510 A1 | 7/2019 | Chrysanthakopoulos et al. | |
| 2019/0322461 A1 | 10/2019 | Banthia et al. | |
| 2019/0325534 A1 | 10/2019 | Perry et al. | |
| 2019/0364734 A1 | 12/2019 | Kriebel et al. | |
| 2020/0045887 A1 | 2/2020 | Bump et al. | |
| 2020/0137957 A1 | 5/2020 | Friesen | |
| 2020/0367436 A1 | 11/2020 | Schlimgen | |
| 2021/0235623 A1 | 8/2021 | Schlimgen | |
| 2021/0294337 A1 | 9/2021 | Van Mill et al. | |
| 2022/0019240 A1 | 1/2022 | Christiansen et al. | |
| 2023/0315105 A1 | 10/2023 | Van Mill et al. | |
| 2024/0122105 A1 | 4/2024 | Van Mill et al. | |

OTHER PUBLICATIONS

The International Bureau of WIPO, International Preliminary Report on Patentability in corresponding PCT Application No. PCT/US2021/045768, Feb. 23, 2023.

J.&M. Mfg. Co., Inc., Auto Gate Shut Off Installation Manual, REV2.26.2014, 12 pgs.

Carnegie Mellon University, National Robotics Engineering Center, Active Fill Control, https://www.nrec.ri.cmu.edu/solutions/agriculture/other-agriculture-proje . . . , Apr. 21, 2020, 2 pgs.

J&M Manufacturing Co, Inc. Grain Cart Operator's Manual, Model X1222 Series, Rev. 4.20.2020, 49 pgs.

U.S. Patent and Trademark Office, International Search Report and Written Opinion in corresponding PCT Application No. PCT/US2021/045768, Nov. 26, 2021.

U.S. Patent and Trademark Office, International Preliminary Report on Patentability in corresponding PCT Application No. PCT/US2021/045768, Dec. 7, 2022.

U.S. Patent and Trademark Office, International Preliminary Report on Patentability in related PCT Application No. PCT/US2023/012206, Apr. 10, 2024, 28 pages.

Canadian Intellectual Property Office, First Office Action issued in related Canadian Patent Application 3172448, Dec. 7, 2023, 6 pages.

Canadian Intellectual Property Office, First Office Action issued in related Canadian Patent Application 3191316, Oct. 10, 2024, 12 pages.

Canadian Intellectual Property Office, Second Office Action issued in related Canadian Patent Application 3172448, Feb. 21, 2025, 5 pages.

* cited by examiner ion Ser. No. PCT/US21/045768 filed Aug. 12, 2021 which claims the priority of U.S. Provisional Patent Application Ser. Nos. 63/065,352 and 63/091,024 filed on Aug. 13, 2020 and Oct. 13, 2020 respectively, the disclosures of which are incorporated herein by reference in their entirety.
AUTOMATED GRAIN FILLING SYSTEM AND RELATED METHODS

CROSS REFERENCE TO RELATED APPLICATIONS

This application is a continuation of PCT Application Serial No. PCT/US21/045768 filed Aug. 12, 2021 which claims the priority of U.S. Provisional Patent Application Ser. Nos. 63/065,352 and 63/091,024 filed on Aug. 13, 2020 and Oct. 13, 2020 respectively, the disclosures of which are incorporated herein by reference in their entirety.

TECHNICAL FIELD

The present disclosure generally relates to devices for agricultural harvesting equipment and, more particularly, to automated systems for transferring harvested grain, and related methods.

BACKGROUND

Harvesting operations for some agricultural materials, such as grains, may involve transferring harvested grain into containers for transport. For example, a combine harvester may separate the grain from the other portions of the plant and may discharge the harvested grain into a container for transport. In some circumstances, the combine may discharge the harvested grain directly into a grain hopper trailer of a tractor-trailer for transport via roads. In other circumstances, the combine may discharge the harvested grain into a grain cart, which may be used to transport the grain across the field, such as to a road, where the grain cart is unloaded into a tractor-trailer for transport via roads.

The present disclosure contemplates that each grain transfer operation involves the potential for spilling grain, such as by overflowing the receiving container or misaligning the discharge stream of the unloading equipment relative to the receiving container. Particularly when grain transfer equipment is operated at a high transfer rate, even a very brief overflow or misalignment may be significantly costly as a large amount of grain may be spilled in a short period of time.

Transferring grain may at times be a labor-intensive operation. An operator may be required to monitor the grain transfer process to avoid spillage, for example. In other instances, an operator may need to move a grain cart filled with grain across a field from a combine harvester to a grain hopper trailer of a tractor-trailer at the edge of the field. Labor savings may be achieved through automation improvements of various aspects or functions of the grain transfer process.

Transporting grain in containers that are not filled to capacity may reduce the time efficiency and/or the cost efficiency of the harvesting and/or transport processes. Similarly, for some agricultural materials, a maximum weight capacity of a transport container may be reached before the transport container is volumetrically full, particularly when the density of the agricultural material varies with moisture content and/or quality.

Accordingly, and in spite of the various advances already made in this field, there is a need for further improvements related to systems and methods for transferring harvested grain into transport containers.

SUMMARY

Generally, an automated grain filling system is provided. The system includes a sensor and a processor. The sensor is configured to detect at least a portion of an upper perimeter of a receiving container and at least a portion of an upper surface of a grain mound in the receiving container. The processor is configured to compare the detected portion of the upper perimeter and the detected portion of the upper surface, and direct the operation of a grain transfer element. The grain transfer element is configured to transfer grain from a supplying container to the receiving container. The directed operation of the grain transfer element is based at least in part on a result of the comparison of the detected portion of the upper perimeter and the detected portion of the upper surface.

In some embodiments, the sensor may include at least one of a LIDAR scanner, a stereoscopic camera, a proximity sensor, a time-of-flight sensor, a time-of-flight camera, and/or a global positioning system receiver. The sensor may be disposed on the grain transfer element. The sensor may be configured to have a field of view including at least a portion of the receiving container. The sensor may be configured to detect at least a portion of a near upper perimeter edge of the receiving container and at least a portion of a far upper perimeter edge of the receiving container. The sensor may be configured to detect an interface of the upper surface of the grain mound along a wall of the receiving container. The sensor may be configured to detect at least a portion of an upper edge of the wall. The processor may be configured to determine a freeboard by calculating a vertical distance between the interface and the detected portion of the upper edge of the wall. The directed operation of the grain transfer element may be based at least in part on the freeboard.

In alternative or additional aspects, the system may be configured to generate a three-dimensional map of the upper surface of the grain mound in the receiving container. The sensor may be configured to detect at least a portion of a left upper perimeter edge of the receiving container and at least a portion of a right upper perimeter edge of the receiving container. The sensor may be configured to detect at least a portion of an intermediate upper edge between the left upper perimeter edge and the right upper perimeter edge. The system may be configured to distinguish the intermediate upper edge from the left upper perimeter edge and the right upper perimeter edge. The directed operation of the grain transfer element may be based at least in part on the detected portion of the intermediate upper edge. The sensor may be configured to detect at least a portion of a partition between the left upper perimeter edge and the right upper perimeter edge. The system may be configured to distinguish the partition from the left upper perimeter edge and the right upper perimeter edge. The directed operation of the grain transfer element may be based at least in part on the detected portion of the partition.

In some embodiments, the grain transfer element may include a spout arranged to direct the grain into the receiving container. The spout may be a movable spout. The spout may be movable to direct the grain laterally farther away from the supplying container and laterally nearer to the supplying container. The spout may be movable to direct the grain generally side-to-side with respect to the grain transfer element. The spout may be movable to direct the grain generally longitudinally toward a forward end and longitudinally toward a rear end of the receiving container. The system may be configured to position the spout to direct the grain.

In alternative or additional aspects, the system may be configured to determine a location of a longitudinal centerline of the receiving container. The system may be configured to position the spout to direct the grain generally along the longitudinal centerline of the receiving container. The system may include a spout position sensor configured to detect a position of the spout. The directed operation of the grain transfer element may be based at least in part on the position of the spout. The system may include a spout position sensor configured to detect a position and/or orientation of the spout. The directed operation of the grain transfer element may be based at least in part on the position and/or orientation of the spout. The movable spout may include a spout articulation mechanism configured to position and/or orient the spout. The system may be configured to direct the operation of the spout articulation mechanism. The spout position sensor may be a multi-axis tilt sensor.

In some embodiments, the system may include a scale element configured to detect a weight of the grain in at least one of the supplying container and/or the receiving container. The directed operation of the grain transfer element may be based at least in part on the weight of the grain. The grain transfer element may include a grain transfer control element configured to adjust a rate of grain transfer via the grain transfer element. The system may be configured to direct the operation of the grain transfer control element. The grain transfer control element may be a movable gate operatively interposing the supplying container and the grain transfer element and the system may be configured to direct the positioning of the gate. The grain transfer control element may include a selectively engageable clutch in a drive train of the grain transfer element and the system may be configured to direct the engagement and disengagement of the clutch. The grain transfer control element may include a valve configured to selectively operate a hydraulic motor of the grain transfer element from a source of hydraulic power and the system may be configured to direct the operation of the valve.

In alternative or additional aspects, the system may include a data storage device operatively connected to the processor. The system may include a user interface device operatively connected to the processor. The user interface device may include at least one of a smart phone, a tablet computer, and/or a control panel. The system may be configured to prevent discharge of grain via the grain transfer element if the system determines that grain discharged from the grain transfer element would not be discharged into the receiving container. The system may be configured to evaluate the location of the upper perimeter of the receiving container relative to the position of the grain transfer element. Directing operation of grain transfer from a grain transfer element based at least in part on a result of the comparison may include providing a signal to move at least one of the supplying container and/or the receiving container to position the grain transfer element relative to the receiving container.

In some embodiments, the automated grain filling system may be associated with a grain cart with a grain cart grain tank. The grain cart grain tank is a supplying container. The system may be configured to provide a signal to move the grain cart to position the grain transfer element relative to a receiving container. The grain cart may include an autonomous drive system communicating with the automated grain filling system. The autonomous drive system may receive a signal and direct movement of the grain cart to position the grain transfer element relative to the receiving container. The automated grain filling system may be associated with a combine harvester with a combine grain tank. The combine grain tank is a supplying container. The system may be configured to provide a signal to move the combine harvester to position the grain transfer element relative to the receiving container. The combine harvester may include an autonomous drive system that communicates with the automated grain filling system. The autonomous drive system may receive a signal and direct movement of the combine harvester to position the grain transfer element relative to the receiving container. Directing the operation of the grain transfer element may include the automated grain filling system communicating with an autonomous drive system. The autonomous drive system may receive a signal and direct movement of at least one of the supplying container and the receiving container to direct the position the grain transfer element relative to the receiving container.

A method of operating an automated grain filling system is provided. The method includes operating a sensor to detect at least a portion of an upper perimeter of a receiving container and at least a portion of an upper surface of a grain mound within the receiving container. The method also includes transferring grain from a supplying container to the receiving container based at least in part on a comparison of the detected portion of the upper perimeter and the detected portion of the upper surface of the grain mound.

In some embodiments, the method may include identifying a near upper perimeter edge and a far upper perimeter edge of the receiving container, and determining a location of a longitudinal centerline of the receiving container between the near upper perimeter edge and the far upper perimeter edge. The method may also include discharging the grain into the receiving container generally along the longitudinal centerline. The method may include detecting an interface of the upper surface of the grain mound along a wall of the receiving container, detecting at least a portion of an upper edge of the wall, and determining a freeboard by calculating a vertical distance between the interface and the detected portion of the upper edge of the wall. The method may include transferring grain based at least in part on the freeboard. The method may include slowing down and/or stopping transferring grain upon determining that the freeboard is less than a predetermined freeboard minimum limit. The method may also include preventing discharge of grain if the grain would not be discharged into the receiving container.

In alternative or additional aspects, the method may include receiving a maximum unload weight limit, detecting a weight of grain unloaded, and stopping transferring grain upon determining that the weight of grain unloaded has reached the maximum unload weight limit. The method may include providing a signal to move at least one of the supplying container and the receiving container to position a grain transfer element relative to the receiving container. The method further comprise communicating between the automated grain filling system and an autonomous drive system and moving at least one of the supplying container and/or the receiving container with the autonomous drive system to position a grain transfer element relative to the receiving container.

In an alternative embodiment, an automated grain filling system includes a sensor and a processor. The sensor is configured to detect at least a portion of an upper edge of a wall of a receiving container and an interface of an upper surface of a grain mound in the receiving container along the wall. The processor is configured to determine a freeboard by calculating a vertical distance between the interface and the upper edge of the wall. The processor directs the operation of a grain transfer element configured to transfer grain from a supplying container to the receiving container. The directed operation of the grain transfer element is based at least in part on the freeboard.

An alternative method of operating an automated grain filling system is provided. The method includes operating a sensor to detect at least a portion of an upper perimeter of a receiving container and at least a portion of an upper surface of a grain mound within the receiving container, detecting at least a portion of an upper edge of a wall of the receiving container, and detecting an interface between the upper surface of the grain mound and the wall. The method includes determining a freeboard by calculating a vertical distance between the interface and the detected portion of the upper edge of the wall. The method also includes transferring grain from a supplying container to the receiving container based at least in part on the freeboard. The method may also include slowing down and/or stopping transferring grain upon determining that the freeboard is less than a predetermined freeboard minimum limit.

In another embodiment, a grain cart is provided and includes a supplying container and a grain transfer element. The grain transfer element includes a movable spout. The grain transfer element is configured to transfer grain from the supplying container to a receiving container. The spout is configured to be positioned to direct the grain generally laterally farther away from the grain cart and generally laterally nearer to the grain cart. The spout is configured to be positioned to direct the grain generally longitudinally toward a forward end of the receiving container and longitudinally toward a rear end of the receiving container. The grain cart may include a spout position sensor configured to detect a position of the spout. The spout position sensor may be a multi-axis tilt sensor configured to send an input to an automated grain filling system. The grain cart may include a spout articulation mechanism configured to position the spout. The articulation mechanism may be configured to be directed by an automated grain filling system.

Additional aspects and advantages of the invention will become more apparent upon further review of the detailed description of the illustrative embodiments taken in conjunction with the accompanying drawings.

DETAILED DESCRIPTION

Illustrative embodiments according to at least some aspects of the present disclosure are described and illustrated below and include devices and methods relating to transferring harvested agricultural materials, such as grain, into transport containers. It will be apparent to those of ordinary skill in the art that the embodiments discussed below are examples and may be reconfigured without departing from the scope and spirit of the present disclosure. It is also to be understood that variations of the exemplary embodiments contemplated by one of ordinary skill in the art shall concurrently comprise part of the instant disclosure. The illustrative embodiments as discussed below may include optional steps, methods, and features that one of ordinary skill should recognize as not being a requisite to fall within the scope of the present disclosure.

The present disclosure includes, among other things, automated systems for transferring harvested grain into transport containers, and related methods. Some illustrative embodiments according to at least some aspects of the present disclosure are described below in the context of a grain cart and operations involving transferring grain from the grain cart to another container. It will be appreciated, however, that similar systems and method may be utilized in connection with other agricultural equipment and containers. As used herein, "transport container" may refer to any device configured to hold harvested grain during movement from one location to another location. Exemplary transport containers may include various types of agricultural equipment, such as grain carts, grain bins, gravity wagons, grain tanks, grain hopper trailers for tractor-trailers, and the like. Transport containers may also include railcars configured to haul grain, barge or ship holds configured to haul grain, and the like. As used herein, "supplying container" may refer to a container from which grain is transferred and "receiving container" may refer to a container into which grain is transferred.

Figure 1:
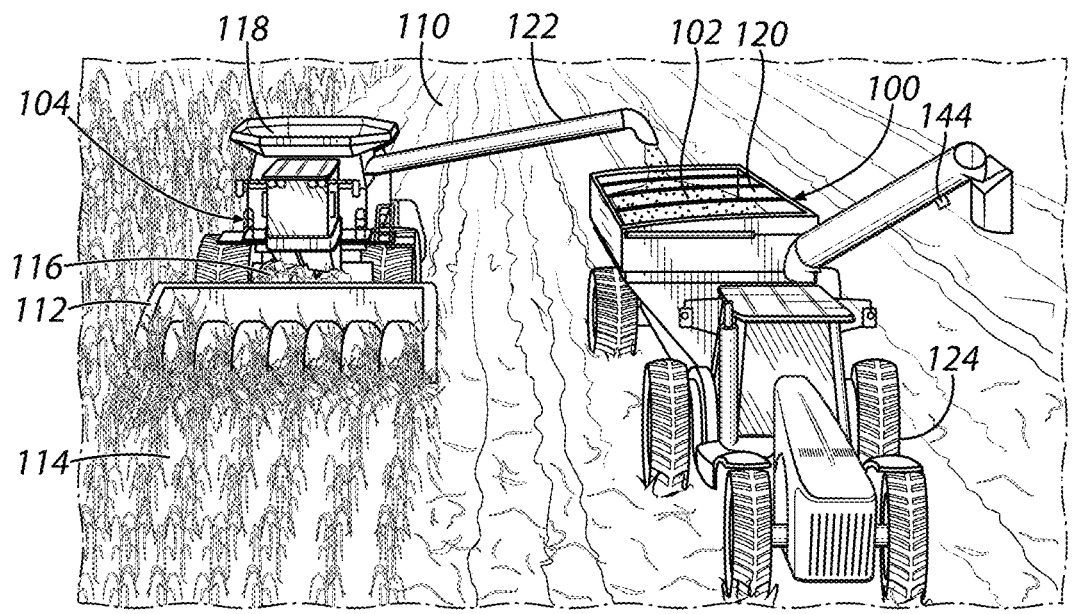
FIG. 1 is a perspective view of an illustrative grain cart receiving harvested grain from a combine harvester.
Figure 2:
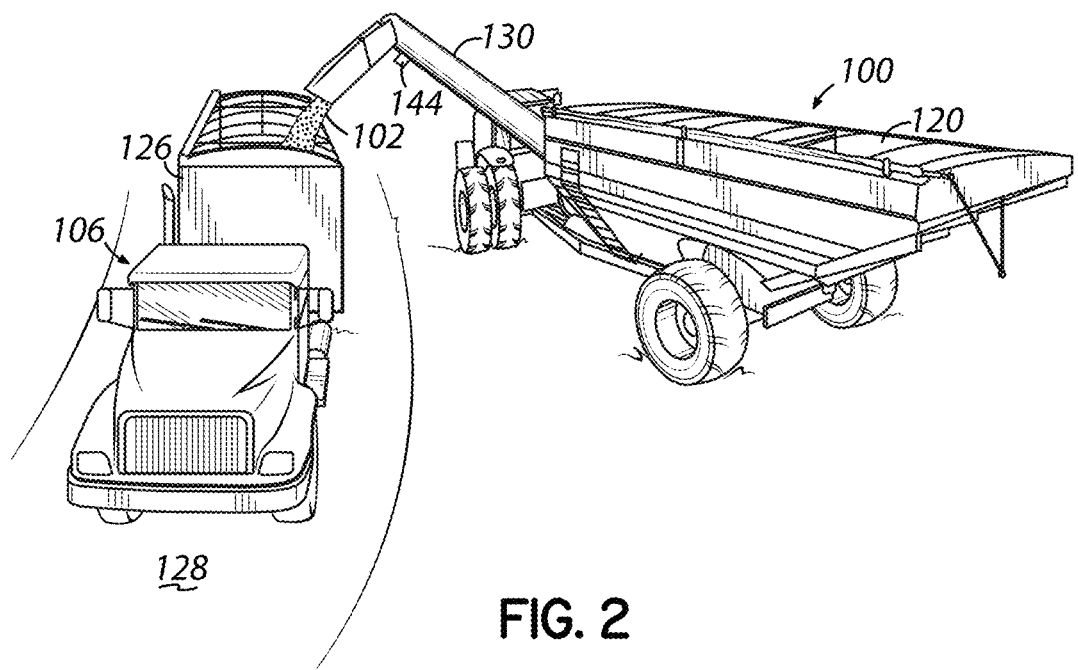
FIG. 2 is a perspective view of the illustrative grain cart of FIG. 1 transferring the harvested grain to a tractor-trailer.
Figure 3:
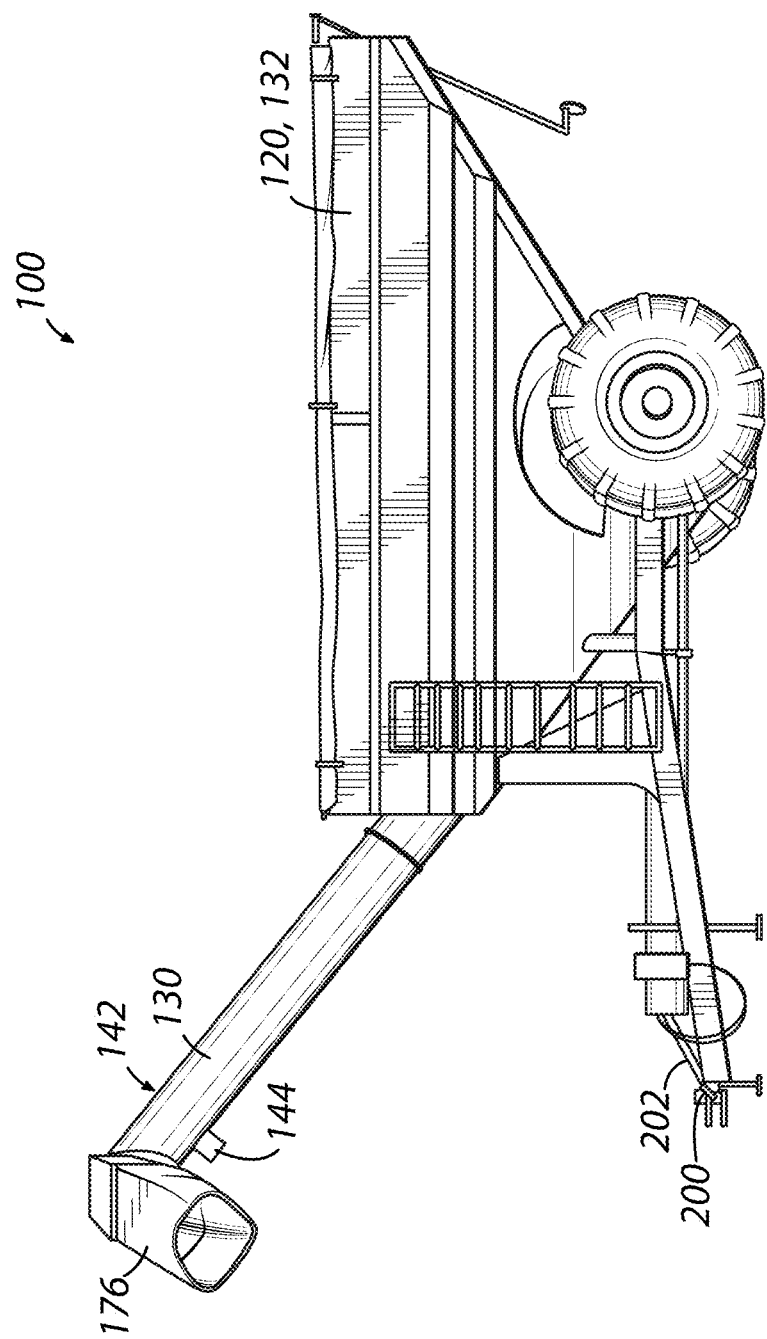
FIG. 3 is a perspective view of the illustrative grain cart of FIGS. 1 and 2.
Figure 4:
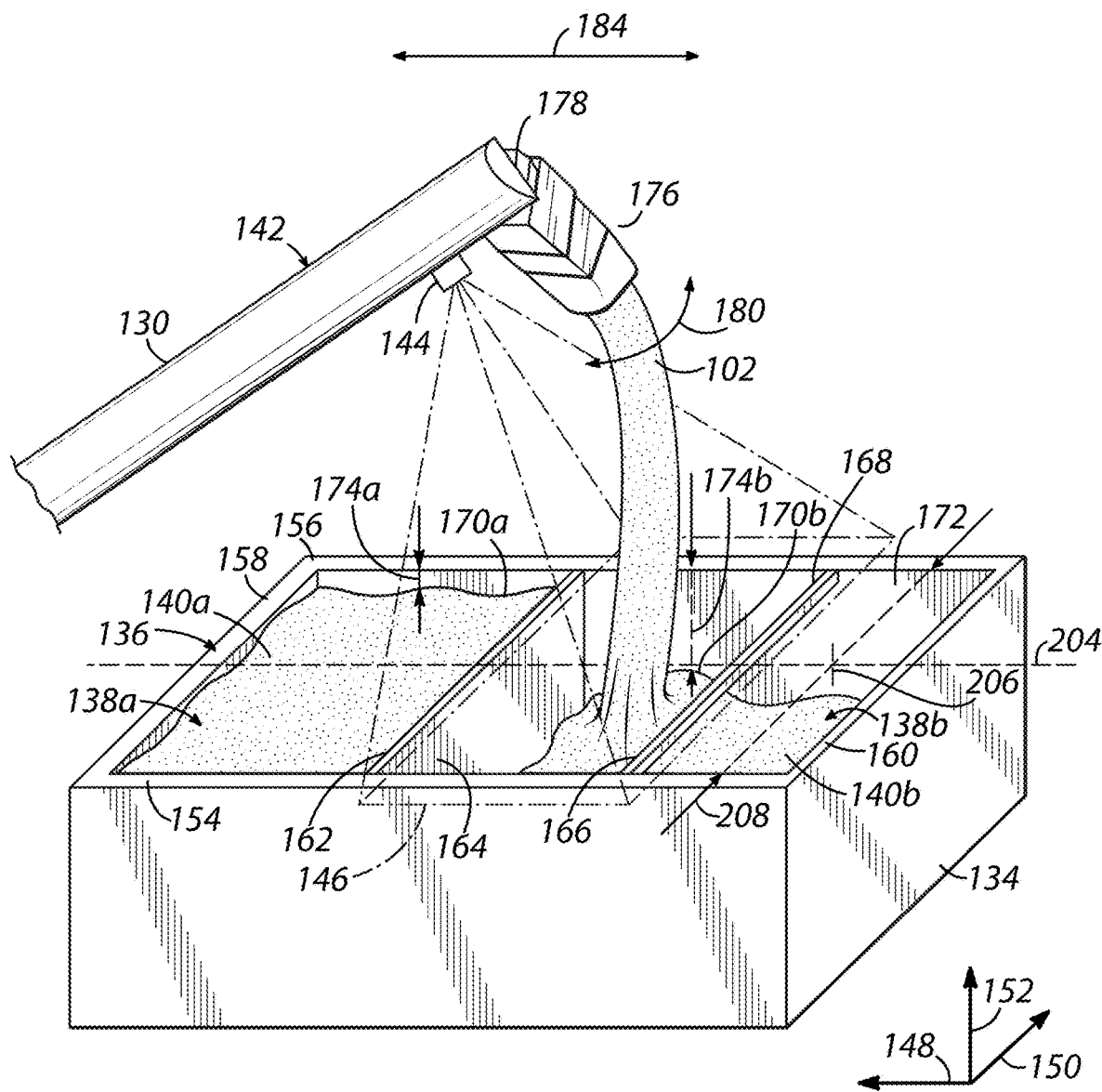
FIG. 4 is a partial isometric view of the illustrative grain cart of FIG. 3 transferring grain into a receiving container.
Figure 5:
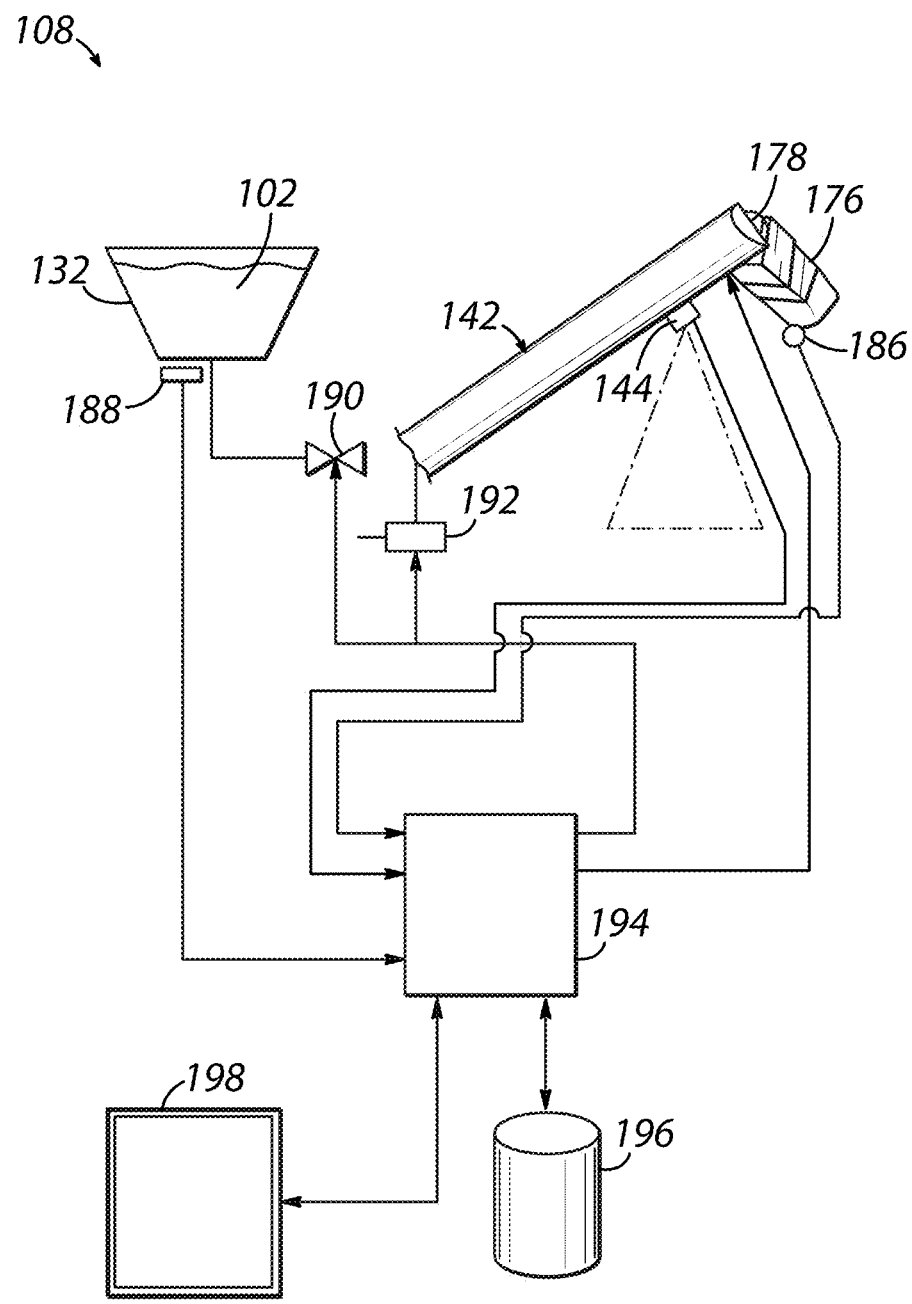
FIG. 5 is a simplified block diagram of an exemplary automated grain filling system.

FIG. 1 is a perspective view of an illustrative grain cart 100 receiving harvested grain 102 from a combine harvester 104, FIG. 2 is a perspective view of the illustrative grain cart 100 transferring the harvested grain 102 to a tractor-trailer 106, FIG. 3 is a perspective view of the illustrative grain cart 100, FIG. 4 is a partial isometric view of the illustrative grain cart 100 transferring the grain 102 into a receiving container 134, and FIG. 5 is a simplified block diagram of an exemplary automated grain filling system 108, all according to at least some aspects of the present disclosure.

Referring to FIG. 1, a combine harvester 104 operating in a field 110 comprises a header 112 configured to cut a crop 114, an internal threshing mechanism 116 configured to separate the harvested grain 102 from the other components of the crop (e.g., chaff and straw), and a grain transport container, such as a combine grain tank 118, configured to receive the harvested grain 102 therein. When it is desired to offload the grain 102 from the combine 104, a grain cart 100 is positioned alongside the combine 104. The combine 104 and the grain cart 100 may be stationary, or they may be moving generally in parallel across the field 110, such as while the combine 104 continues to harvest the crop 114. The combine 104 discharges the harvested grain 102 into a grain transport container of the grain cart 100, such as a grain cart grain tank 120. For example, the combine 104 includes a combine unloading conveyor 122 (e.g., an auger), which is configured to transfer the grain 102 from the combine grain tank 118 to the grain cart 100. The loaded grain cart 100 is driven across the field 110, such as by a tractor 124.

Referring to FIG. 2, the grain 102 in the grain cart 100 is transferred (e.g., unloaded) into a grain hopper trailer 126 of a tractor-trailer 106, which may be located on or near a road 128. The grain cart 100 includes a grain cart unloading conveyor 130, such as an auger, which is configured to transfer the grain 102 from the grain cart grain tank 120 to the grain hopper trailer 126. The tractor-trailer 106 then transports the harvested grain 102 via the road 128.

Referring to FIGS. 1-5, the illustrative grain cart 100 comprises an automated grain filling system 108, which is configured to operate in connection with transferring grain 102 from a first, supplying transport container 132 (e.g., the grain cart grain tank 120) to a second, receiving transport container 134 (e.g., the grain hopper trailer 126). Generally, the automated grain filling system 108 is configured to facilitate the transfer of the grain 102 from the supplying container 132 to the receiving container 134 while reducing the likelihood of spilling grain 102 and/or facilitating increased transfer speed and/or efficiency, for example.

The illustrative automated grain filling system 108 is configured to detect and/or compare at least a portion of an upper perimeter 136 of the receiving container 134 and at least a portion of the upper surfaces 138a, 138b of the grain mounds 140a, 140b in the receiving container 134. Based at least in part on the result of the comparison of the upper perimeter 136 and at least a portion of the upper surfaces 138a, 138b, the system 108 directs the operation of a grain transfer element 142 (e.g., the grain cart unloading conveyor 130). For example, the system 108 may start, stop, and/or adjust the speed of the grain 102 transfer via the grain transfer element 142 and/or the system 108 may adjust the position of grain transfer element 142 to direct the grain 102 into the receiving container 134, as desired. Other automated component movements and/or grain transfer may be used as well, or in the alternative. The system 108 may adjust the position of grain transfer element 142 to direct the grain 102 into portions of the receiving container 134 where there is less grain 102 in order to more evenly distribute the grain 102 in the receiving container 134, for example.

Exemplary systems according to at least some aspects of the present disclosure may include one or more sensors that are configured to detect various parameters associated with transferring grain 102 from the supplying container 132 to the receiving container 134. For example, the illustrative system 108 includes a sensor 144 configured to detect at least a portion of the upper perimeter 136 of the receiving container 134 and/or at least a portion of the upper surfaces 138a, 138b of the grain mounds 140a, 140b in the receiving container 134. In some exemplary embodiments, separate receiving container upper perimeter and grain mound sensors may be utilized. Similarly, multiple sensors having different fields of view (overlapping or not overlapping) may be utilized.

In the illustrative system 108, the sensor 144 is configured to detect both at least a portion of the upper perimeter 136 of the receiving container 134 and at least a portion of the upper surfaces 138a, 138b of the grain mounds 140a, 140b in the receiving container 134. In this illustrative system 108, the sensor 144 comprises a LIDAR ("light detection and ranging" and/or "laser imaging, detection, and ranging") scanner comprising a laser configured to scan the desired field of view 146. In alternative exemplary embodiments, the sensor 144 may comprise, for example, one or more stereoscopic cameras, proximity sensors, time-of-flight sensors, time-of-flight cameras, and/or global navigation satellite system (e.g., global positioning system (GPS)) receivers, and/or any other suitable sensor.

In some exemplary embodiments comprising laser-based sensors, the sensor 144 may be configured to generate a point cloud of the field of view 146. The system 108 may be configured to detect and/or identify features of interest within the field of view 146, such as by assessing point density and/or performing analysis, such as a least squares fit. For example, the system 108 may be configured to identify at least a portion of the upper perimeter 136 of the receiving container 134 and at least a portion of the upper surfaces 138a, 138b of the grain mounds 140a, 140b in the receiving container 134.

In this illustrative embodiment, the sensor 144 is disposed on the grain cart 100, such as on the grain transfer element 142. The sensor 144 points generally outward and downward from the grain transfer element 142 of the grain car 100, thus having a field of view 146 including at least a portion of the receiving container 134 and the grain mounds 140a 140b. More specifically, the field of view 146 includes the portion of the receiving container 134 within an area into which the grain transfer element 142 is configured to discharge the grain 102. Depending on the extent of the field of view 146, only a portion of the entire upper perimeter 136 of the receiving container 134 may be detectable by the sensor 144 at any particular time. In some exemplary embodiments, the sensor 144 may be configured with a broader field of view 146, such as to detect portions of the receiving container 134 substantially beyond the area into which the grain transfer element 142 is arranged to discharge the grain 102.

The illustrative system 108 may be configured to detect various aspects of the receiving container 134 and/or the grain mounds 140a, 140b therein. For clarity, the following description mentions various features of an exemplary receiving container 134 with reference to a longitudinal (e.g., front-back) direction 148, a lateral (e.g., side to side) direction 150, and a vertical (up and down) direction 152, which generally describe typical receiving containers 134 configured for transporting grain 102, such as the grain hopper trailer 126 of the tractor-trailer 106. Additionally, for clarity, the following description utilizes the point of view of a grain cart 100 which is positioned generally laterally alongside the receiving container 134. Thus, from the point of view of the grain cart 100, a feature at the forward end or rear end of the receiving container 134 may be described as left or right. Similarly, from the point of view of the grain cart 100, a feature on a lateral side of the receiving container 134 may be described as near or far.

This illustrative system 108 is configured to detect and/or distinguish at least a portion of the upper perimeter of the receiving container 134. This may be accomplished by detecting and/or distinguishing one or more of the upper perimeter edges that define the upper opening of the container 134. These upper perimeter edges (of an exemplary square or rectangular container) may be edges 154, 156, 158, 160. Such detection may not be of the edge or edges themselves but of other receivers or detectable components fixed at the desired location or locations.

This illustrative system 108 is configured to detect and/or distinguish laterally extending upper edges that are not the left-most upper perimeter edge 158 or the right-most upper perimeter edge 160 of the receiving container 134. For example, the system 108 is configured to detect and/or distinguish an intermediate upper edge 162 of a lateral partition 164 (which separates the grain mounds 140a, 140b) and/or an intermediate upper edge 166 of a lateral cross member 168 (e.g., a lateral brace or a tarp bow).

The system 108 may be configured to determine that a particular detected laterally extending upper edge is the left upper perimeter edge 158 by determining that the longitudinally extending upper perimeter edges 154, 156 extend to, but not extend substantially longitudinally beyond, the left upper perimeter edge 158 or the right upper perimeter edge 160. That is, the near and far upper perimeter edges 154, 156 extend to, but do not extend substantially left or right, beyond the left upper perimeter edge 158 or the right upper perimeter edge 160, respectively. Similarly, a laterally extending upper edge, such as intermediate upper edge 162 or intermediate upper edge 166 may be identified as an intermediate laterally extending upper edge because the near and far upper perimeter edges 154, 156 extend substantially longitudinally (e.g., left and right from the perspective of the grain cart 100) beyond the intermediate laterally extending upper edge. Generally, the illustrative system 108 may be configured to ignore intermediate laterally extending upper edges. Alternatively, some embodiments may be configured to identify laterally extending partitions and/or may be configured to treat separate portions of the receiving container 134 defined by a partition 164 as separate receiving containers 134.

In some exemplary embodiments, one or more sensors may be configured to detect the grain mounds 140a, 140b in the receiving container 134. For example, one or more sensors may be configured to obtain sufficient data for the system 108 to generate a three-dimensional map of at least a portion of the upper surfaces 138a, 138b of the grain mounds 140a, 140b. Some exemplary systems may be configured to develop a three-dimensional map of substantially all of the upper surfaces 138a, 138b of the grain mounds 140a, 140b.

The illustrative system 108 is configured to detect the interfaces 170a, 170b between the grain mounds 140a, 140b and a far wall 172 of the receiving container 134. The interfaces 170a, 170b may comprise a generally continuous, curved or straight line on the respective wall (e.g., far wall 172) of the receiving container 134. The system 108 is configured to determine the freeboard 174a, 174b, which is used herein to refer to the vertical distance between the highest point of the interface 170a, 170b and the lowest point on the corresponding upper perimeter edge 156. Although this illustrative system 108 is configured to determine the freeboard 174a, 174b on the far wall 172 of the receiving container 134, other exemplary embodiments may determine the freeboard on other walls of the receiving container 134 in addition to or instead of on the far wall 172. For example, alternative exemplary embodiments may be configured to determine freeboard on opposite walls, on adjacent walls, on three of four walls, and/or on all walls of the receiving container 134.

In some circumstances, it may be advantageous to utilize a system configured to detect one or more interfaces between the grain mounds 140a, 140b and the receiving container 134 instead of a system configured to develop a three-dimensional map of substantial portions of the upper surfaces 138a, 138b of the grain mounds 140a, 140b. For example, focusing on the interfaces rather than large areas of the surfaces 138a, 138b may require less scanning by the sensor 144 (e.g., LIDAR scanner) and/or less processing. Additionally, substantial dust may be generated as the grain 102 is discharged into the receiving container 134, particularly where the incoming stream of grain 102 meets the upper surfaces 138a, 138b of the grain mounds 140a, 140b. As a result, in some circumstances, utilizing measurements at the wall of the receiving container (e.g., the mound-wall interface) may reduce scanning disruptions caused by dust.

The grain transfer element 142 of the illustrative grain cart 100 includes a movable spout 176 at the discharge end of the unloading conveyor 130. The spout 176 may be articulatable in at least one direction by a spout articulation mechanism 178. For example, the spout 176 may be movable generally as indicated by arrow 180 so as to direct the discharge stream of grain 102 generally laterally farther away from the grain cart 100 and/or generally laterally nearer to the grain cart 100. That is, in the case of a grain cart positioned generally parallel alongside the receiving container 134, generally toward the far wall 172 and/or generally toward the near wall 182 of the receiving container 134. In some exemplary embodiments, the spout 176 may be movable generally as indicated by arrow 184 so as to direct the discharge stream of grain 102 generally left and/or right. That is, in the case of a grain cart positioned generally parallel alongside the receiving container 134, generally toward a longitudinally forward end and/or toward a longitudinally rear end of the receiving container 134. Some exemplary embodiments may include a spout position sensor 186 configured to detect the position of the spout 176. In some embodiments, the spout position sensor 186 may send a signal indicating the position and/or orientation of the spout 176. In some embodiments, the spout position sensor 186 may monitor the movement of the spout articulation mechanism 178. In alternate embodiments, the spout position sensor 186 may monitor the movement of one or more components of the spout articulation mechanism 178. For example, a multi-axis tilt sensor may be used and/or sensors otherwise associated with mechanisms used to move the spout 176.

An autonomous drive system may be additionally, or alternatively, provided for the transport container or supplying container, such as the grain cart 100. Specifically, the grain cart 100 may incorporate an autonomous drive system and the system 108 would signal to the autonomous drive control of the grain cart 100 to move either forwards for backwards relative to the receiving container 134. Alternatively or additionally, the system 108 may signal the operator to move the grain cart 100 forward or backward (that is, toward the front or toward the rear of the receiving container 134 when the grain cart 100 is positioned parallel to the receiving container 134 for movement in these opposite directions). The grain cart 100 may start moving once and stop moving once with several slowdown periods in between or the grain cart 100 may come to a complete stop one or more times between the initial start of grain cart movement and the final stop of the grain cart 100. The system 108 would sense the mound being formed by the filling operation at one spot or location in the receiving container 134 for example, during a slowdown period or while at a complete stop, and determine when the mound reaches a predetermined height. At this time, the system 108 would provide a signal to an autonomous drive system and/or to the operator and the grain cart 100 would be moved accordingly in order to fill at a different location in the receiving container 134. As mentioned, the grain cart 100 could be moved by the operator driving the tractor towing the grain cart 100 and/or the grain cart 100 could be automatically moved by an autonomous drive system. This automatic feedback system will further ensure that the entire receiving container 134 is filled more completely and quickly by moving the grain transfer element 142 both independent of the grain cart movement and by the use of grain cart movement in an automatic or at least semi-automatic manner.

The illustrative system 108 includes at least one scale element 188 (e.g., load cell or weigh bar) configured to detect the weight of the load in the supplying container 132 (e.g., the grain cart grain tank 120). For example, the scale element 188 may be configured to detect various weights of the grain cart 100, such as an empty weight, a loaded weight, and a current weight. By subtracting the appropriate measured weights, the weight of grain loaded and/or unloaded may be calculated. For example, by subtracting the empty weight from the current weight, an amount of grain 102 in the grain cart 100 may be determined. Then, by setting that current weight as the loaded weight and monitoring an updated current weight, an amount of grain 102 that has been unloaded may be determined.

The illustrative system 108 includes one or more grain transfer control elements 190, 192 configured to adjust the rate (including starting and/or stopping) of grain 102 transfer via the grain transfer element 142. For example, the illustrative system 108 may include a movable gate 190 operatively interposing the supplying container 132 and the grain transfer element 142. Opening the gate 190 allows grain 102 to enter the grain transfer element 142 and shutting the gate 190 prevents grain 102 from reaching the grain transfer element 142. Positioning the gate 190 at an intermediate position between shut and open may allow the grain transfer element 142 to operate at less than its maximum grain transfer rate. The gate 190 may be hydraulically operable, for example.

The illustrative system 108 may include a selectively engageable mechanical element 192 in the drive train for the grain transfer element 142. For example, the selectively engageable mechanical element 192 may comprise a clutch, which may be an electric and/or hydraulically operable device and may be configured to selectively mechanically engage and disengage the grain transfer element 142, such as with respect to a power takeoff of a tractor 124 to which the grain cart 100 may be operatively coupled. In other embodiments including a hydraulically driven grain transfer element 142, the selectively engageable mechanical element 192 may comprise a remotely controllable valve configured to selectively operate the hydraulic motor from the source of hydraulic power.

The illustrative system 108 includes one or more processors 194 configured to provide computation, analysis, control, and/or monitoring functions associated with various elements of the system 108, as described herein. The processor 194 may be operatively coupled to one or more data storage devices 196, which may be comprise instructions for the processor 194 (e.g., software or firmware) and/or which may store data associated with operation of the system 108. Generally, unless specifically indicated otherwise, any operation described herein as being performed by the system 108 may be performed by, at the direction of, and/or under the control of the processor 194.

The illustrative system 108 includes one or more user interface devices 198 operatively connected to the processor 194. For example, the user interface device 198 may comprise a smart phone or tablet computer running an application configured to interface with the processor 194. Alternatively or in addition, a user interface device 198 may comprise a dedicated device, such as a control panel. Various user interface devices 198 may be operatively connected to the processor 194 via wires and/or wirelessly. For example, an operator driving a tractor 124 pulling a grain cart 100 may utilize a user interface device 198 located in the cab of the tractor 124 to operate the system 108 on the grain cart 100. As one of many other alternatives for allowing operator control and interface, some or all of the necessary processing hardware and software may be contained in and/or accessible through one or more hand held devices such as a tablet computer, lap top computer, smart phone and the like. The software may include a mobile phone application, for example, and/or may be stored remotely, such as "in the cloud."

Generally, this illustrative system 108 is configured such that the receiving container 134 does not require special modifications, special markings visible to the sensor 144, etc., for proper operation of the system 108. For example, the illustrative system 108 is generally configured to detect some or all of the upper perimeter 136 of any receiving container 134, regardless of size, shape, color, orientation, etc. Further, this illustrative system 108 is configured such that pre-programming with information about a particular receiving container 134 is not necessary (e.g., container dimensions, capacity, etc.). This illustrative system 108 is generally configured to be substantially self-contained on or in association with the grain cart. For example, the user interface device 198 may be operatively connected to the system 108 on the grain cart 100, even though the user interface device 108 may not be physically located on the grain cart 100. Further, this illustrative system 100 may operate without communication between the system 100 and the receiving container 134. As such, this illustrative system 108 is generally configured to be capable of independent operation and for use with any receiving container 134.

The illustrative system 108 is configured such that unloading is prevented unless the grain 134 is expected to be discharged into the receiving container 134 without substantial spillage. In some exemplary embodiments, the system 108 may evaluate the location of the upper perimeter 136 of the receiving container 134 relative to the position and/or orientation of the grain transfer element 142 and/or the spout 176. For example, if the system determines that grain 102 discharged from the spout 176 would not go into the receiving container 134 because there is no receiving container 134 present or because the receiving container 134 is positioned such that the grain 102 will not go into the receiving container 134, the system 108 may not open the gate 190 to allow grain 102 to enter the grain transfer element 142. Similarly, the illustrative system 108 includes an auto-shutoff feature configured to shut the gate 190 and/or disengage the clutch during unloading if the system 108 determines that the grain 102 will not go into the receiving container 134. For example, if the grain cart 100 or the receiving container 134 pulls away while grain transfer is in progress, the system 108 will shut the gate 190 and/or disengage the clutch to prevent or minimize spillage.

Exemplary methods of operating an automated grain filling system 108 according to at least some aspects of the present disclosure are described below with reference to FIGS. 1-5 and may include optional and/or alternative structures and/or operations. Although FIGS. 1-5 and the corresponding description focus on the use of the automated grain filling system 108 in connection with transferring grain from the grain cart 100 to the grain hopper trailer 126, it will be appreciated that generally similar operations may be utilized when transferring grain between other types of equipment, such as generally from any supplying container 132 to any receiving container 134. Generally, unless specifically indicated otherwise, the various operations described below may be automatically performed or directed by the processor 194, such as instructed by software or firmware.

An exemplary grain cart 100 may be prepared for use, such as by coupling the grain cart 100 to a tractor 124 using a hitch 200. Additionally, the grain cart's 100 power takeoff connection 202 may be coupled to the tractor's power takeoff. Additionally, hydraulic lines may be connected between the tractor 124 and the grain cart 100.

The grain cart 100 may be positioned near a source of grain (e.g., a combine 104) and/or may receive grain 102 in the grain cart grain tank 120. The grain cart 100 may be positioned near a receiving container 134 (e.g., a grain hopper trailer 126). The tractor's 124 power takeoff or other source of energy (hydraulics) for the grain cart may be started. If necessary, the grain transfer element 142 of the grain cart 100 may be extended from a folded position. While approaching or near the receiving container 134, the operator may specify a maximum unload weight limit, if desired, and/or may direct the system 108 to commence a grain transfer operation, such as via the user interface 198. Alternatively, the maximum unload weight limit may be specified by the system 108 automatically when the unload location is detected, for example, by one or more location sensors (such as, e.g., GPS, RFID, etc.). The maximum unload weight limit may be selected based on the weight capacity of the receiving container 134 (e.g., grain-hopper trailer 126), for example. In alternative embodiments, the system 108 may determine the maximum unload weight limit by performing a calculation, for example. In some embodiments, the system 108 may select the maximum unload weight from a list of stored values, for example.

The system 108 may activate the sensor 144, which may attempt to detect the upper perimeter 136 of the receiving container 134. The system 108 may identify the near upper perimeter edge 154 and the far upper perimeter edge 156 and/or may confirm that both the near upper perimeter edge 154 and the far upper perimeter edge 156 are present within the field of view 146. If either the near upper perimeter edge 154 or the far upper perimeter edge 156 is not detected within the field of view 146, the system 108 may wait to proceed until they are both detected and/or the system 108 may alert the operator, such as via the user interface 198.

The system 108 may determine the location of a longitudinal centerline 204 of the receiving container 134, such as generally at the midpoint 206 of a lateral dimension 208 between the near upper perimeter edge 154 and the far upper perimeter edge 156. The system 108 may actuate the spout articulation mechanism 178 to position the spout 176 such that, when the grain 102 is discharged, the grain 102 will go into the receiving container 134 at a location approximately along the centerline 204. If the spout 176 cannot be positioned so that discharged grain 102 will go into the receiving container 134 near the centerline 204, such as due to limitations on the extent of movement of the spout 176 by the spout articulation mechanism 178, the system 108 may wait to proceed until the grain cart 100 and/or the receiving container 134 is repositioned, and the operator may be notified. The system 108 may be configured to automatically move the spout 176 as necessary during the grain transfer operation to maintain the discharge of grain 102 generally near the centerline 204, even if the grain cart 100 is moved relative to the receiving container 134 and/or if the spout 176 is moved left or right (if capable). Thus, the system 108 may be configured to discharge the grain 102 generally at the centerline 204 even when the grain cart 100 and the receiving container 134 are not positioned precisely in parallel and/or are oriented somewhat transversely with respect to one another.

The system 108 may determine whether an left upper perimeter edge 158 and/or an right upper perimeter edge 160 are detected within the field of view 146. If a left upper perimeter edge 158 and/or a right upper perimeter edge 160 are detected, the system 108 may determine whether the current position of the spout 176 will discharge grain 102 into the receiving container 134. If the spout articulation mechanism 178 is configured to move the spout 176 so as to direct the discharge stream of grain 102 generally left and/or right, the spout articulation mechanism 178 may position the spout 176 to discharge grain 102 into the receiving container 134 (if it would otherwise be spilled) and/or the spout articulation mechanism 178 may position the spout 176 to discharge grain 102 into a desired portion of the receiving container 134. For example, in some circumstances, it may be desirable to fill a receiving container front portion first, then a rear portion, then a middle portion. If the spout 176 cannot be moved generally left and/or right to direct the discharged grain 102 into the receiving container 134, the system 108 may wait to proceed until the grain cart 100 and/or the receiving container 134 is repositioned, and the operator may be notified. Similarly, if the spout 176 is not movable generally left and/or right and the spout 176 is positioned such that grain 102 discharged from the spout 176 would spill, the system 108 may wait to proceed until the grain cart 100 and/or the receiving container 134 is repositioned, and the operator may be notified.

Once the system 108 has been directed to commence the grain transfer operation by the operator and the spout 176 is positioned to discharge the grain 102 into the receiving container, the system 108 may begin unloading the grain cart 100. If not already started, the grain transfer element 142 may begin operating. For example, the power takeoff may be engaged and/or a selectively engageable mechanical element 192 may be engaged. If equipped with a gate 190, the gate 190 may be at least partially opened to allow grain 102 to flow to grain transfer element 142. Grain 102 may be discharged into the receiving container 134. During the grain transfer operation, the sensor 144 may monitor the grain mound 140, 140*b* and the upper perimeter 136 of the receiving container 134.

If, at any time during the grain transfer operation, the system 108 determines that the spout 176 is positioned such that the grain 102 may be discharged outside of the receiving container 134, the system 108 may stop the transfer of grain 102. For example, the system 108 may shut the gate 190 and/or disengage the selectively engageable mechanical element 192. Alternatively, if the system 108 determines the spout 176 is movable by the spout articulation mechanism 178 to a position at which the grain 102 would be discharged into the receiving container 134, the system 108 may move the spout 176 using the spout articulation mechanism 178.

If, at any time during the grain transfer operation, the system 108 determines that the grain mound upper surface 138*a*, 138*b* has reached a volumetric fill limit, the system 108 may stop the transfer of grain 102. For example, the system 108 may monitor the freeboard 174*a*, 174*b* on the far wall 172 of the receiving container 134. If the detected freeboard 174*a*, 174*b* reaches a predetermined minimum limit (which may be set by the operator), the system 108 may stop the transfer of grain 102. Alternatively, if the system 108 determines the spout 176 is movable by the spout articulation mechanism 178 to a position at which the grain 102 would be discharged into a portion of the receiving container 134 at which the freeboard 174*a*, 174*b* is above the minimum limit, the system 108 may move the spout 176 using the spout articulation mechanism 178.

In some exemplary embodiments, the system 108 may be configured to alert the operator to reposition the grain cart 100 with respect to the receiving container 134. For example, when filling a generally elongated grain-hopper trailer 126, the operator may move the grain cart 100 generally along the side of the grain-hopper trailer 126 to discharge grain 102 along most or all of the length of the receiving container 134. In some exemplary embodiments, the system 108 may be configured to stop and restart the flow of grain 102 automatically as the grain cart 100 is repositioned with respect to the receiving container 134. It will be appreciated that, in some circumstances, similar operations may be conducted with the grain cart 100 remaining stationary and the receiving container 134 moving to allow various portions of the receiving container 134 to be filled.

In the illustrative system 108, the operator may set and/or adjust the freeboard minimum limit, such as by using the user interface 198. The freeboard minimum limit may be specified as a vertical distance (e.g., using distance measurement units) and/or using a proportional numerical scale (e.g., 1-10). In some exemplary embodiments, the freeboard minimum limit may be determined by the operator specifying the type of grain 102 being transferred (e.g., rice-wet, rice-medium, or rice-dry) and/or the system 108 may determine an appropriate freeboard minimum limit based on the expected heap angle. Generally, the freeboard minimum limit may be set so that the risk of spillage during transport of the receiving container 134 is minimized, while also maximizing the use of the volume of the receiving container 134.

If, at any time during the grain transfer operation, the system 108 determines that the weight of the grain 102 unloaded during the current grain transfer operation has reached the maximum unload weight limit specified by the operator, the system 108 may stop the transfer of grain 102. For example, the system 108 may calculate the difference between a measured loaded weight and a measured current weight to determine an amount of grain 102 that has been unloaded.

After the desired amount of grain 102 has been transferred to the receiving container 134, the grain cart 100 may be positioned near another receiving container 134 to offload the remaining grain 102, if necessary. Once empty, the grain cart 100 may receive another load of grain 102 from the combine 104.

Accordingly, by utilizing an automated grain cart unloading system, such as the illustrative system 108, the risk of grain spillage during grain transfer operations may be reduced and the ease with which a receiving container may be loaded fully and/or evenly may be improved. As such, less experienced operators may operate equipment, such as grain carts 100, with less risk of spillage. Further, conditions that impede visibility of the grain unloading process for the grain cart operator may have less impact or introduce less risk of spillage. Further still, exemplary systems reducing the risk of spillage may facilitate operation of the unloading equipment (e.g., unloading conveyor) at high rate (e.g., about 1000 bushels per minute) rather than at a reduced rate (e.g., less than about 500 bushels per minute).

Exemplary methods of manufacturing a grain cart 100 according to at least some aspects of the present disclosure may include installing and/or operatively connecting various components of the illustrative system 108 as described herein.

Figure 6:
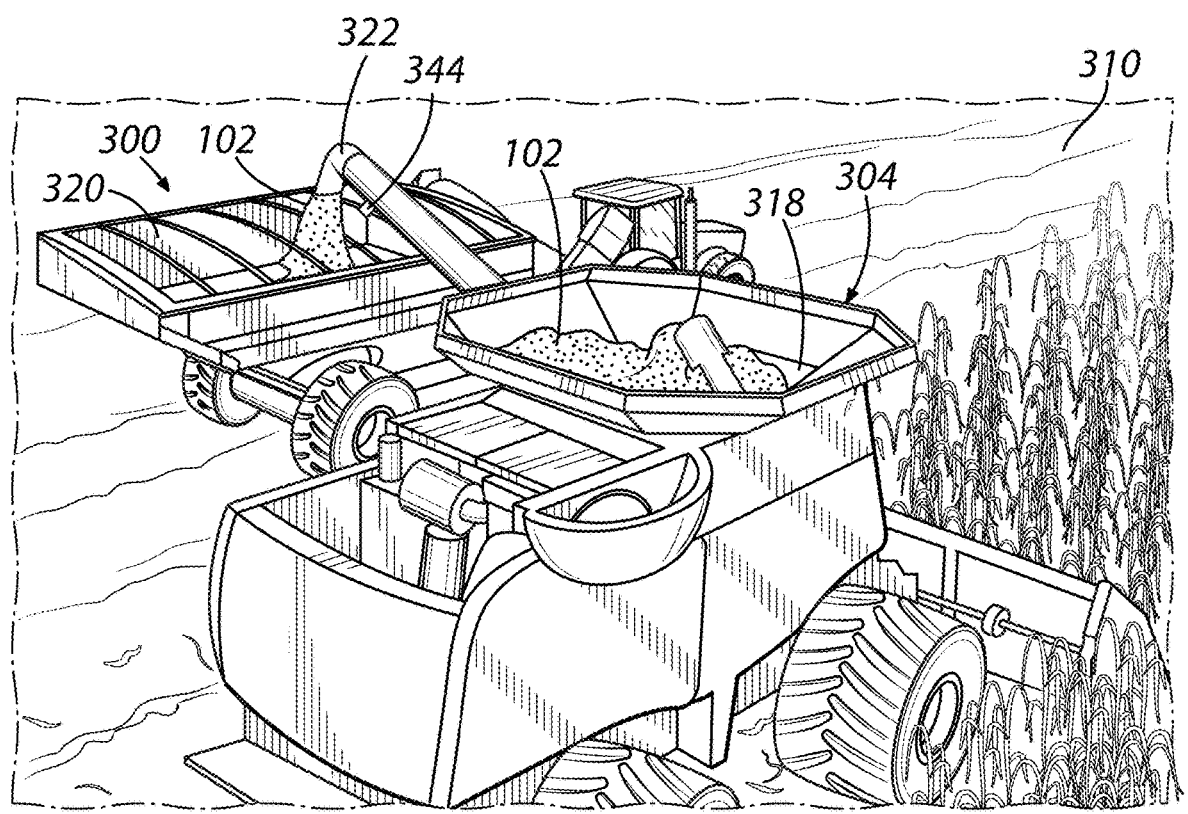
FIG. 6 is a perspective view of an illustrative combine harvester transferring grain into a grain cart.

FIG. 6 is a perspective view of an illustrative combine harvester 304 transferring grain 102 into a grain cart 300, according to at least some aspects of the present disclosure. This combine 304 comprises an automated grain filling system, which may be generally similar in construction and operation to the automated grain filling system 108 described above with reference to FIGS. 1-5. Unless specifically indicated, the description of the structure and function or methodology of the automated grain filling system 108 generally applies to the automated grain filling system associated with the combine 304.

This illustrative automated grain filling system is configured to operate in connection with transferring grain 102 from a combine grain tank 318 to another transport container, such as a grain cart grain tank 320, via a combine unloading conveyor 322 (e.g., auger). A sensor 344 configured to detect some or all of the receiving container upper perimeter and/or the grain mound in the receiving container is disposed on the combine unloading conveyor 322, for example. Operation of the automated grain filling system associated with the combine 304 is generally similar to the operation of the automated grain filling system 108 described above. The automated grain filling system associated with the combine 304 may be operated with both the combine 304 and the receiving container (e.g., the cart grain tank 320) moving, such as generally in parallel, across the field 310 while the combine 304 continues to harvest the grain 102.

While the present invention has been illustrated by the description of specific embodiments thereof, and while the embodiments have been described in considerable detail, it is not intended to restrict or in any way limit the scope of the appended claims to such detail. The various features discussed herein may be used alone or in any combination within and between the various embodiments. Additional advantages and modifications will readily appear to those skilled in the art. The invention in its broader aspects is therefore not limited to the specific details, representative apparatus and methods and illustrative examples shown and described. Accordingly, departures may be made from such details without departing from the scope or spirit of the general inventive concept.

What is claimed is:

1. An automated grain filling system for directing the operation of a grain transfer element with a movable spout to transfer grain from a supplying container to a receiving container, the automated grain filling system comprising:
   one or more sensors configured to detect at least a portion of an upper perimeter of the receiving container and at least a portion of an upper surface of a grain mound in the receiving container; and
   a processor configured to:
      compare the detected portion of the upper perimeter and the detected portion of the upper surface, and
      direct the operation of the grain transfer element and control the movement of the movable spout to direct the grain into the receiving container based at least in part on a result of the comparison of the detected portion of the upper perimeter and the detected portion of the upper surface;
   wherein the movable spout is movable to direct the grain laterally farther away from the supplying container and laterally nearer to the supplying container, and to direct the grain generally longitudinally toward a forward end of the receiving container and toward a rearward end of the receiving container.

2. The automated grain filling system of claim 1, wherein the one or more sensors comprise at least one of a LIDAR scanner, a stereoscopic camera, a proximity sensor, a time-of-flight sensor, a time-of-flight camera, or a global positioning system receiver.

3. The automated grain filling system of claim 1, wherein the one or more sensors are disposed on the grain transfer element and are configured to have a field of view including at least a portion of the receiving container.

4. The automated grain filling system of claim 1, wherein the one or more sensors are configured to detect at least a portion of a near upper perimeter edge of the receiving container and at least a portion of a far upper perimeter edge of the receiving container,
   wherein the processor is configured to determine a location of a longitudinal centerline of the receiving container based at least in part on the detected portion of the near upper perimeter edge and the detected portion of the far upper perimeter edge,
wherein the processor is configured to direct the operation of the grain transfer element and control the movement of the movable spout to direct the grain generally along the longitudinal centerline of the receiving container.

5. The automated grain filling system of claim 1, wherein the one or more sensors are configured to detect an interface between the upper surface of the grain mound in the receiving container and a wall of the receiving container,
wherein the one or more sensors are configured to detect at least a portion of an upper edge of the wall,
wherein the processor is configured to determine a freeboard by calculating a vertical distance between the detected interface and the detected portion of the upper edge of the wall, and
wherein at least one of the directed operation of the grain transfer element or the controlled movement of the movable spout is based at least in part on the freeboard.

6. The automated grain filling system of claim 1, wherein the processor is configured to generate a three-dimensional map of the upper surface of the grain mound in the receiving container.

7. The automated grain filling system of claim 1, wherein the one or more sensors are configured to detect at least a portion of a left upper perimeter edge of the receiving container, at least a portion of a right upper perimeter edge of the receiving container, and at least a portion of an intermediate upper edge between the left upper perimeter edge and the right upper perimeter edge,
wherein the processor is configured to distinguish the intermediate upper edge from the left upper perimeter edge and the right upper perimeter edge, and
wherein at least one of the directed operation of the grain transfer element or the controlled movement of the movable spout is based at least in part on the detected portion of the intermediate upper edge.

8. The automated grain filling system of claim 1, wherein the one or more sensors are configured to detect at least a portion of a left upper perimeter edge of the receiving container, at least a portion of a right upper perimeter edge of the receiving container, and at least a portion of a partition between the left upper perimeter edge and the right upper perimeter edge, and
wherein the processor is configured to distinguish the partition from the left upper perimeter edge and the right upper perimeter edge, and
wherein at least one of the directed operation of the grain transfer element or the controlled movement of the movable spout is based at least in part on the detected portion of the partition.

9. The automated grain filling system of claim 1, wherein the automated grain filling system further comprises a spout position sensor configured to detect at least one of a position or orientation of the movable spout, and
wherein at least one of the directed operation of the grain transfer element or the controlled movement of the movable spout is based at least in part on at least one of the detected position or the detected orientation of the movable spout.

10. The automated grain filling system of claim 9, wherein the movable spout comprises a spout articulation mechanism configured to at least one of position or orient the movable spout, and
wherein the processor is configured to direct the operation of the spout articulation mechanism.

11. The automated grain filling system of claim 9, wherein the spout position sensor is a multi-axis tilt sensor.

12. The automated grain filling system of claim 1, further comprising a scale element configured to detect a weight of the grain in at least one of the supplying container or the receiving container,
wherein at least one of the directed operation of the grain transfer element or the controlled movement of the movable spout is based at least in part on the detected weight of the grain.

13. The automated grain filling system of claim 1, wherein the grain transfer element comprises a grain transfer control element configured to adjust a rate of grain transfer via the grain transfer element, and
wherein the processor is configured to direct the operation of the grain transfer control element.

14. The automated grain filling system of claim 13, wherein the grain transfer control element comprises a movable gate operatively interposing the supplying container and the grain transfer element, and
wherein the processor is configured to direct the positioning of the gate.

15. The automated grain filling system of claim 13, wherein the grain transfer control element comprises a selectively engageable clutch in a drive train of the grain transfer element, and
wherein the processor is configured to direct the engagement and disengagement of the clutch.

16. The automated grain filling system of claim 13, wherein the grain transfer control element comprises a valve configured to selectively operate a hydraulic motor of the grain transfer element from a source of hydraulic power, and
wherein the processor is configured to direct the operation of the valve.

17. The automated grain filling system of claim 1, further comprising a data storage device operatively connected to the processor.

18. The automated grain filling system of claim 1, further comprising a user interface device operatively connected to the processor.

19. The automated grain filling system of claim 18, wherein the user interface device comprises at least one of a smart phone, a tablet computer, or a control panel.

20. The automated grain filling system of claim 1, wherein the processor is configured to evaluate the position of the grain transfer element relative to the detected portion of the upper perimeter of the receiving container and to prevent discharge of grain via the grain transfer element if the processor determines that the discharged grain would not be discharged into the receiving container.

21. The automated grain filling system of claim 1, wherein the processor is configured to evaluate the location of the upper perimeter of the receiving container relative to the position of the grain transfer element.

22. The automated grain filling system of claim 1, wherein directing the operation of the grain transfer element further comprises providing a signal to move at least one of the supplying container or the receiving container to position the grain transfer element relative to the receiving container.

23. A grain cart, comprising:
the automated grain filling system of claim 1; and
a grain cart grain tank, the supplying container including the grain cart grain tank.

24. The grain cart of claim 23, wherein the processor is configured to provide a signal to move the grain cart to position the grain transfer element relative to the receiving container.

25. The grain cart of claim 23, further comprising an autonomous drive system communicating with the automated grain filling system, wherein the autonomous drive system receives a signal and directs movement of the grain cart to position the grain transfer element relative to the receiving container.

26. A combine harvester, comprising:
the automated grain filling system of claim 1; and
a combine grain tank, the supplying container including the combine grain tank.

27. The combine harvester of claim 26, wherein the automated grain filling system is configured to provide a signal to move the combine harvester to position the grain transfer element relative to the receiving container.

28. The combine harvester of claim 26, further comprising an autonomous drive system communicating with the automated grain filling system, wherein the autonomous drive system receives a signal and directs movement of the combine harvester to position the grain transfer element relative to the receiving container.

29. The automated grain filling system of claim 1, wherein directing the operation of the grain transfer element comprises the processor communicating with an autonomous drive system, and
wherein the autonomous drive system directs movement of at least one of the supplying container or the receiving container to direct the position the grain transfer element relative to the receiving container.

30. The automated grain filling system of claim 1, wherein the one or more sensors comprises:
a first sensor configured to detect at least a portion of the upper perimeter of the receiving container; and
a second sensor configured to detect at least a portion of the upper surface of the grain mound in the receiving container.

31. The automated grain filling system of claim 5, wherein the one or more sensors comprises:
a first sensor configured to detect at least a portion of the upper edge of the wall of the receiving container; and
a second sensor configured to detect the interface between the upper surface of the grain mound in the receiving container and the wall of the receiving container.

32. A method of operating an automated grain filling system to direct the operation of a grain transfer element with a movable spout to transfer grain from a supplying container to a receiving container, the method comprising:
detecting at least a portion of an upper perimeter of the receiving container;
detecting at least a portion of an upper surface of a grain mound within the receiving container;
directing the operation of the grain transfer element to transfer grain from the supplying container to the receiving container based at least in part on a comparison of the detected portion of the upper perimeter and the detected portion of the upper surface of the grain mound;
controlling the movement of the movable spout to direct the grain into the receiving container by directing the grain laterally farther away from the supplying container and laterally nearer to the supplying container, and directing the grain generally longitudinally toward a forward end of the receiving container and toward a rearward end of the receiving container.

33. The method of claim 32, further comprising:
identifying a near upper perimeter edge and a far upper perimeter edge of the receiving container;
determining a location of a longitudinal centerline of the receiving container between the near upper perimeter edge and the far upper perimeter edge; and
directing the operation of the grain transfer element and controlling the movement of the movable spout to direct the grain into the receiving container generally along the longitudinal centerline.

34. The method of claim 32, further comprising:
detecting an interface between the upper surface of the grain mound in the receiving container and a wall of the receiving container;
detecting at least a portion of an upper edge of the wall;
determining a freeboard by calculating a vertical distance between the detected interface and the detected portion of the upper edge of the wall; and
directing the operation of the grain transfer element and controlling the movement of the movable spout to direct the grain into the receiving container based at least in part on the freeboard.

35. The method of claim 34, further comprising slowing down or stopping transferring grain upon determining that the freeboard is less than a predetermined freeboard minimum limit.

36. The method of claim 32, further comprising preventing discharge of grain if the grain would not be discharged into the receiving container.

37. The method of claim 32, further comprising:
receiving a maximum unload weight limit;
detecting a weight of grain unloaded; and
stopping transferring grain upon determining that the weight of grain unloaded has reached the maximum unload weight limit.

38. The method of claim 32, further comprising providing a signal to move at least one of the supplying container or the receiving container to position the grain transfer element relative to the receiving container.

39. The method of claim 32, further comprising communicating between the automated grain filling system and an autonomous drive system; and
moving at least one of the supplying container or the receiving container with the autonomous drive system to position a grain transfer element relative to the receiving container.

40. A grain cart comprising:
a supplying container;
a grain transfer element configured to transfer grain from the supplying container to a receiving container;
a movable spout coupled to the grain transfer element, the movable spout is movable to direct the grain generally laterally farther away from the grain cart and generally laterally nearer to the grain cart, and to direct the grain generally longitudinally toward a forward end of the receiving container and longitudinally toward a rearward end of the receiving container;
a spout articulation mechanism to control the movement of the movable spout;
a spout position sensor configured to detect at least one of a position or orientation of the movable spout;
one or more sensors configured to detect at least a portion of an upper perimeter of the receiving container and at least a portion of an upper surface of a grain mound in the receiving container; and
a processor configured to control the spout articulation mechanism based at least in part on the detected portion of the upper perimeter, the detected portion of the upper surface, and at least one of the detected position or detected orientation of the movable spout, and the processor is configured to control the spout articulation mechanism to control the movement of the movable spout.

41. The grain cart of claim 40, wherein the spout position sensor is a multi-axis tilt sensor.

42. An automated grain filling system configured to direct the operation of a grain transfer element with a movable spout to transfer grain from a supplying container to a receiving container, the automated grain filling system comprising:
one or more sensors configured to detect at least a portion of an upper edge of a wall of the receiving container and an interface between an upper surface of a grain mound in the receiving container and the wall of the receiving container; and
a processor configured to compare the detected portion of the upper edge and the detected interface, and direct the operation of the grain transfer element and control the movement of the movable spout based at least in part on a result of the comparison of the detected portion of the upper edge and the detected interface;
wherein the one or more sensors are configured to detect at least a portion of a near upper perimeter edge of the receiving container and at least a portion of a far upper perimeter edge of the receiving container,
wherein the processor is configured to determine a location of a longitudinal centerline of the receiving container based at least in part on the detected portion of the near upper perimeter edge and the detected portion of the far upper perimeter edge, and
wherein the processor is configured to direct the operation of the grain transfer element and control the movement of the movable spout to direct the grain generally along the longitudinal centerline of the receiving container.

43. An automated grain filling system configured to direct the operation of a grain transfer element with a movable spout to transfer grain from a supplying container to a receiving container, the automated grain filling system comprising:
one or more sensors configured to detect at least a portion of an upper edge of a wall of the receiving container and an interface between an upper surface of a grain mound in the receiving container and the wall of the receiving container; and
a processor configured to compare the detected portion of the upper edge and the detected interface, and direct the operation of the grain transfer element and control the movement of the movable spout based at least in part on a result of the comparison of the detected portion of the upper edge and the detected interface;
wherein the one or more sensors are configured to detect at least a portion of a left upper perimeter edge of the receiving container, at least a portion of a right upper perimeter edge of the receiving container, and at least a portion of an intermediate upper edge between the left upper perimeter edge and the right upper perimeter edge,
wherein the processor is configured to distinguish the intermediate upper edge from the left upper perimeter edge and the right upper perimeter edge, and
wherein at least one of the directed operation of the grain transfer element or the controlled movement of the movable spout is based at least in part on the detected portion of the intermediate upper edge.

44. An automated grain filling system configured to direct the operation of a grain transfer element with a movable spout to transfer grain from a supplying container to a receiving container, the automated grain filling system comprising:
one or more sensors configured to detect at least a portion of an upper edge of a wall of the receiving container and an interface between an upper surface of a grain mound in the receiving container and the wall of the receiving container; and
a processor configured to compare the detected portion of the upper edge and the detected interface, and direct the operation of the grain transfer element and control the movement of the movable spout based at least in part on a result of the comparison of the detected portion of the upper edge and the detected interface;
wherein the one or more sensors are configured to detect at least a portion of a left upper perimeter edge of the receiving container, at least a portion of a right upper perimeter edge of the receiving container, and at least a portion of a partition between the left upper perimeter edge and the right upper perimeter edge,
wherein the processor is configured to distinguish the partition from the left upper perimeter edge and the right upper perimeter edge, and
wherein at least one of the directed operation of the grain transfer element or the controlled movement of the movable spout is based at least in part on the detected portion of the partition.

* * * * *